United States Patent
Philipp et al.

(10) Patent No.: US 10,814,799 B1
(45) Date of Patent: Oct. 27, 2020

(54) MITIGATION OF ERRANT SIGNAL EFFECTS ON AN IMAGE SENSOR OF A VEHICLE

(71) Applicant: GM Global Technology Operations LLC, Detroit, MI (US)

(72) Inventors: Tzvi Philipp, Herzliya (IL); Ron M. Hecht, Ra'anana (IL); Ariel Telpaz, Givat Haim Meuhad (IL); Michael Baltaxe, Ra'anana (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/694,289

(22) Filed: Nov. 25, 2019

(51) Int. Cl.
   *B60R 11/04* (2006.01)
   *B60W 50/02* (2012.01)

(52) U.S. Cl.
   CPC ......... *B60R 11/04* (2013.01); *B60W 50/0205* (2013.01); *B60W 2050/0215* (2013.01); *B60W 2420/42* (2013.01)

(58) Field of Classification Search
   None
   See application file for complete search history.

(56) References Cited

U.S. PATENT DOCUMENTS

| | | | |
|---|---|---|---|
| 6,452,179 B1 * | 9/2002 | Coates | G01J 3/443 250/339.09 |
| 10,288,693 B2 * | 5/2019 | Baker | G01R 31/367 |
| 10,295,462 B1 * | 5/2019 | Yap | G01N 21/35 |
| 2002/0047624 A1 * | 4/2002 | Stam | H05B 45/37 315/291 |
| 2011/0205361 A1 * | 8/2011 | Guillot | G01V 5/0075 348/143 |
| 2017/0084250 A1 * | 3/2017 | Jia | G01J 3/10 |
| 2017/0241931 A1 * | 8/2017 | Kitazawa | G01N 33/0047 |
| 2018/0232047 A1 * | 8/2018 | Yoon | G06T 7/80 |

* cited by examiner

*Primary Examiner* — Tyler W. Sullivan
(74) *Attorney, Agent, or Firm* — Cantor Colburn LLP

(57) ABSTRACT

Systems and methods to mitigate an effect of an errant signal on an image sensor of a vehicle involve collecting light and separating the light to obtain signals at different wavelengths. A method includes determining an intensity of the light at each of the different wavelengths, and identifying the errant signal based on the intensity of the light exceeding a threshold value at an errant signal wavelength among the different wavelengths. The errant signal is mitigated using the controller.

20 Claims, 5 Drawing Sheets

MITIGATION OF ERRANT SIGNAL EFFECTS ON AN IMAGE SENSOR OF A VEHICLE

INTRODUCTION

The subject disclosure relates to the mitigation of errant signal effects on an image sensor of a vehicle.

Vehicles (e.g., automobiles, trucks, construction equipment, farm equipment, automated factory equipment) increasingly include sensors to obtain information about the vehicle and its surroundings. The information facilitates autonomous operation of the vehicle, the activation of semi-autonomous systems (e.g., collision avoidance, adaptive cruise control, automated braking), or alerts to the driver. Exemplary sensors include radio detection and ranging (radar) systems, ultrasound sensors, light detection and ranging (lidar) systems, and cameras or, more generally, image sensors that include optical systems. Image sensors can be susceptible to errant signals. Errant signals can be the unintended effects of sunlight or another light source or a reflection from a light source, for example. Errant signals can also be spoofing signals, which are purposefully deceptive signals that are generated (e.g., with a laser pointer) to trigger incorrect operation of sensor-based vehicle systems. Accordingly, it is desirable to provide mitigation of errant signal effects on an image sensor of a vehicle.

SUMMARY

In one exemplary embodiment, a method to mitigate an effect of an errant signal on an image sensor of a vehicle includes collecting light, using a spectrometer, and separating the light to obtain signals at different wavelengths. The method also includes determining, using a spectral peak detector, an intensity of the light at each of the different wavelengths, and identifying, using a controller, the errant signal based on the intensity of the light exceeding a threshold value at an errant signal wavelength among the different wavelengths. The errant signal is mitigated using the controller.

In addition to one or more of the features described herein, the collecting the light includes collecting from a 360 degree span.

In addition to one or more of the features described herein, the mitigating includes issuing an alert or performing a predefined maneuver of the vehicle.

In addition to one or more of the features described herein, the mitigating includes filtering out the errant signal wavelength from input light to the image sensor.

In addition to one or more of the features described herein, the mitigating includes filtering out the errant signal wavelength from the input light to one or more additional image sensors of the vehicle.

In addition to one or more of the features described herein, the collecting the light includes obtaining input light to the image sensor.

In addition to one or more of the features described herein, the obtaining the input light to the image sensor includes using a beam splitter in a path of the input light to the image sensor.

In addition to one or more of the features described herein, the mitigating includes filtering out the errant signal wavelength from the input light to the image sensor.

In addition to one or more of the features described herein, the filtering out the errant signal wavelength includes changing a thickness of a spectral filter in a path of the input light to the image sensor.

In addition to one or more of the features described herein, the changing the thickness of the spectral filter includes controlling a micro electromechanical system.

In another exemplary embodiment, a system to mitigate an effect of an errant signal on an image sensor of a vehicle includes a spectrometer to collect light and separate the light to obtain signals at different wavelengths. The system also includes a spectral peak detector to determine an intensity of the light at each of the different wavelengths, and a controller to identify the errant signal based on the intensity of the light exceeding a threshold value at an errant signal wavelength among the different wavelengths and to mitigate the errant signal.

In addition to one or more of the features described herein, the spectrometer collects the light from a 360 degree span.

In addition to one or more of the features described herein, the controller mitigates the errant signal by issuing an alert or performing a predefined maneuver of the vehicle.

In addition to one or more of the features described herein, the controller mitigates the errant signal by filtering out the errant signal wavelength from input light to the image sensor.

In addition to one or more of the features described herein, the vehicle includes one or more additional image sensors, and the controller filters out the errant signal wavelength from the input light to the one or more additional image sensors.

In addition to one or more of the features described herein, the spectrometer collects the light by obtaining input light to the image sensor.

In addition to one or more of the features described herein, the system also includes a beam splitter in a path of the input light to the image sensor to direct the input light to the image sensor to the spectrometer.

In addition to one or more of the features described herein, the controller mitigates the errant signal by filtering out the errant signal wavelength from the input light to the image sensor.

In addition to one or more of the features described herein, the system also includes a spectral filter in a path of the input light to the image sensor. The controller filters out the errant signal wavelength by changing a thickness of the spectral filter.

In addition to one or more of the features described herein, the controller changes the thickness of the spectral filter by controlling a micro electromechanical system.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
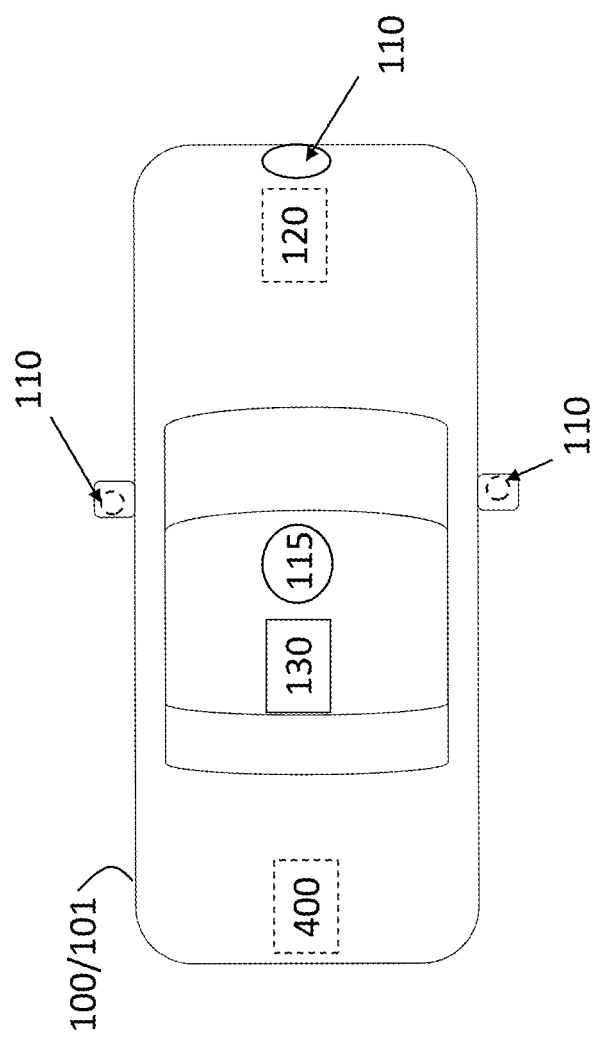
FIG. 1 is a block diagram of vehicle that includes the mitigation of errant signal effects on an image sensor of an image sensor module according to one or more embodiments.

The following description is merely exemplary in nature and is not intended to limit the present disclosure, its application or uses. It should be understood that throughout the drawings, corresponding reference numerals indicate like or corresponding parts and features.

As previously noted, a camera or other image sensor is one of the types of sensors that may be used in a vehicle to obtain information that facilitates autonomous or semi-autonomous operation of the vehicle or a warning to an operator of the vehicle. An errant signal can interfere with the detection performed by the image sensor. A high-intensity errant signal can also damage the image sensor. While an errant signal may be inadvertent and have a naturally occurring source (e.g., sun glare), for example, spoofing is specifically addressed herein for explanatory purposes. A spoofing signal refers to an errant signal that is purposefully generated (e.g., with a laser pointer) to negatively affect the operation of the image sensor. Embodiments of the systems and methods detailed herein relate to the mitigation of errant signal effects on an image sensor of a vehicle. A spectrometer is used to detect the spoofing signal, which is discussed herein as an exemplary errant signal. The detection may be performed on a per-image sensor basis according to exemplary embodiments. Once the spoofing signal is detected, different mitigating actions may be taken, as detailed.

In accordance with an exemplary embodiment, FIG. 1 is a block diagram of vehicle 100 that includes the mitigation of errant signal effects on an image sensor 310 (FIG. 3) of an image sensor module 110. The exemplary vehicle 100 shown in FIG. 1 is an automobile 101. The vehicle 100 is shown with three image sensor modules 110, but the number and location of the image sensor modules 110 are not limited by the exemplary illustration. An exemplary spectrometer module 115 is also shown. However, the number and location of spectrometer modules 115 differ according to one or more embodiments. An imaging system 400 is shown in the vehicle 100, as well. The imaging system 400, according to alternate embodiments, includes an image sensor module 110 and a corresponding spectrometer module 115, as further detailed with reference to FIG. 4. The vehicle 100 may include additional sensors 130 (e.g., radar system, lidar system). The numbers and locations of the additional sensors 130 are also not intended to be limited by the exemplary illustration.

A controller 120 is also shown in FIG. 1. The controller 120 may obtain information from the image sensor modules 110 and other sensors 130 to control aspects of vehicle operation. The controller 120 may also control aspects of the image sensor modules 110 based on one or more spectrometer modules 115, as further discussed. The controller 120 may act alone or in combination with processing circuitry of the image sensor modules 110 or spectrometer modules 115. The controller 120 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
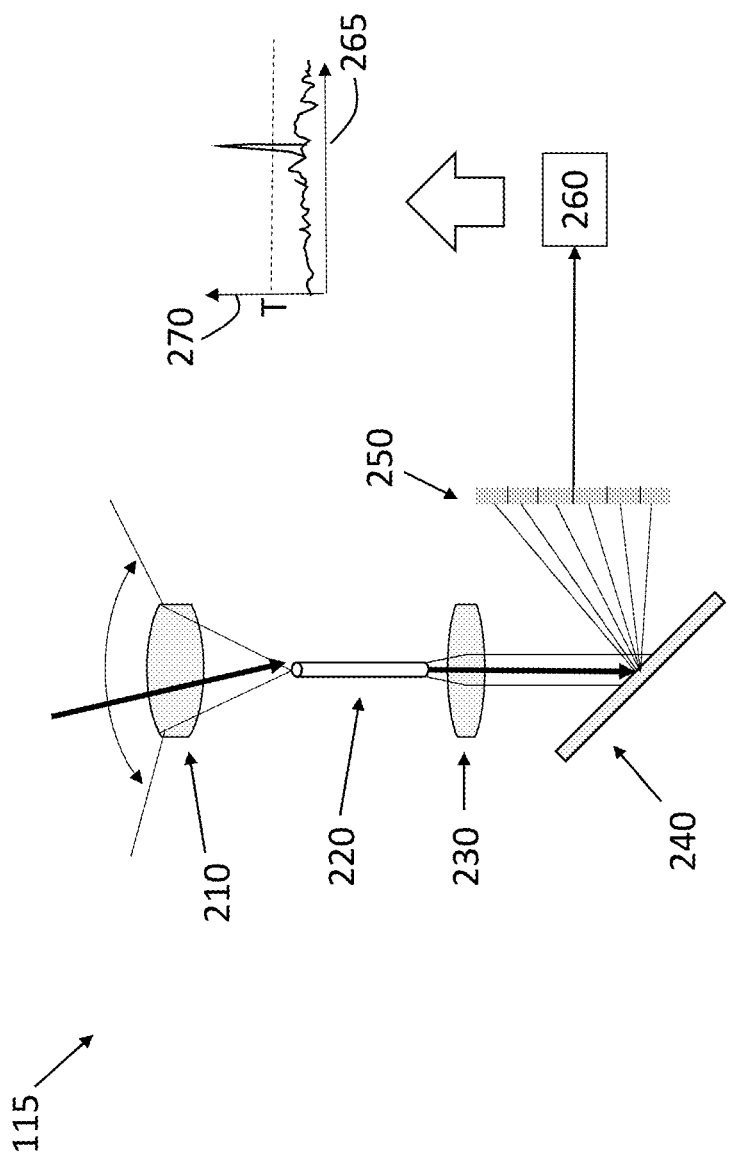
FIG. 2 details an exemplary spectrometer module used to mitigate errant signal effects on one or more image sensors of one or more image sensor modules of the vehicle according to an exemplary embodiment.

FIG. 2 details an exemplary spectrometer module 115 used for mitigation of errant signal effects on one or more image sensors 310 (FIG. 3) of one or more image sensor modules 110 of the vehicle 100 according to an exemplary embodiment. The exemplary spectrometer module 115 shown in FIG. 2 may not be associated with any particular image sensor module 110 but, instead, may be used for mitigation of errant signal effects on some or all of the image sensor modules 110. That is, the exemplary spectrometer module 115 may be located on the roof of the vehicle 100, as shown in FIG. 1, for example. The lens 210 collects light from a 360 degree span around the spectrometer module 115. An optical homogenizer 220 may be a multimode fiber bundle or multimode waveguide, for example, and acts as a mixer with uniform distribution. Another lens 230 directs the light to a diffraction grating 240. The diffraction grating 240 acts as a dispersive element that splits the light into the different component wavelengths at a pixelated sensor 250. The pixelated sensor 250 may be a linear diode array, a linear charge coupled device (CCD) sensor, a linear complementary metal-oxide-semiconductor (CMOS) sensor, an avalanche photodiode (APD) sensor, or a single-photon avalanche diode (SPAD) sensor, for example. The components from the optical homogenizer 220 to the pixelated sensor 250 represent the spectrometer portion of the spectrometer module 115.

A spectral peak detector 260 may be used with the pixelated sensor 250. As shown, the spectral peak detector 260 provides an indication of intensity, shown along axis 270, for a set of wavelengths, shown along axis 265, measured by the pixelated sensor 250. A threshold intensity T is indicated. When intensity from the peak detector 260 exceeds the threshold intensity T, the wavelength at which that intensity occurs may be determined to be the wavelength of an errant signal. Alternatively, a specific spectral pattern may be learned, and when that spectral pattern is detected, the scene might be classified as including an errant signal of a pre-specified (corresponding) wavelength. As previously noted, the exemplary spectrometer module 115 shown in FIG. 2 may not be associated with any particular image sensor module 110. Thus, the errant signal identified by the spectrometer module 115 and, more specifically, the peak detector 260, may not be relevant to a given image sensor module 110 of the vehicle 100.

That is, based on the position and field of view of the given image sensor module 110, the errant signal may not reach the image sensor 310 of that image sensor module 110. Regardless, according to one or more embodiments, mitigation may be performed at all the image sensor modules 110 when the exemplary spectrometer module 115 is used. Two exemplary forms of mitigation may be performed. The first involves issuing alerts or implementing predefined safety maneuvers based on the detection of an errant signal (e.g., spoofing signal). The second involves modifying each of the image sensor modules 110, as further discussed with reference to FIG. 3.

Figure 3:
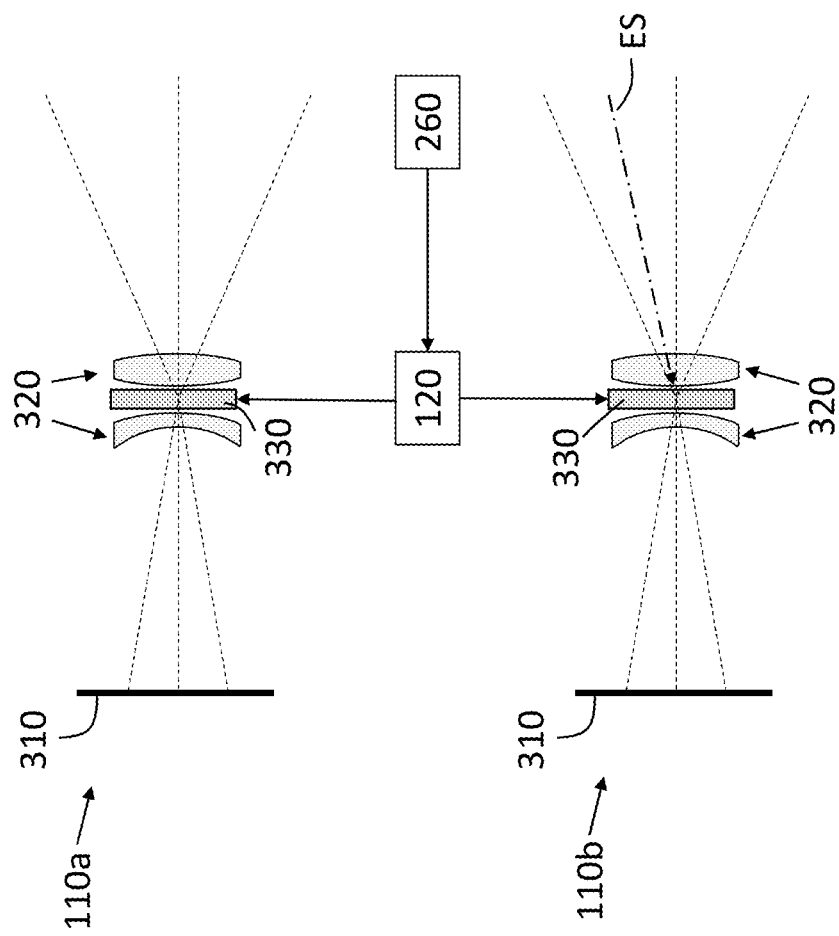
FIG. 3 details exemplary image sensor modules used for mitigation of errant signal effects according to an exemplary embodiment.

FIG. 3 details exemplary image sensor modules 110a, 110b (generally referred to as 110) used for mitigation of errant signal effects according to an exemplary embodiment.

Each image sensor module 110 includes an image sensor 310 itself. Light reaches the image sensor 310 via lenses 320 and a dynamic (i.e., adaptive) spectral filter 330. The spectral filter 330 exhibits destructive interference at specific wavelengths based on its thickness. The destructive interference means that the intensity of light at that wavelength is reduced at the spectral filter 330 before it reaches the image sensor 310, thereby reducing or eliminating the deleterious effects of the errant signal. By controlling the thickness of the spectral filter 330, a particular wavelength can be targeted for the destructive interference.

As FIG. 3 indicates, the controller 120 controls the thickness of the spectral filter 330 and, thus, the wavelength that is prevented from reaching the image sensor 310. The control may be via a microelectromechanical system (MEMS), for example. As discussed with reference to FIG. 2, an errant signal wavelength ES may be determined based on the output of the spectral peak detector 260 of the spectrometer module 115. The controller 120 may then control the thickness of the spectral filter 330 to prevent this errant signal wavelength ES from reaching the image sensor 310 of each image sensor module 110.

As noted in the discussion of FIG. 2, a spectrometer module 115 that is not associated with any particular image sensor module 110 may identify an errant signal that does not actually affect one or more of the image sensor modules 110. In the exemplary case shown in FIG. 3, light approaching image sensor module 110a does not include an errant signal but light approaching image sensor module 110b does. According to an exemplary embodiment, based on the identification of the errant signal wavelength ES using the spectral peak detector 260, the controller 120 controls the thickness of the spectral filter 330 of both image sensor modules 110a, 110b to keep out the errant signal wavelength ES. According to an alternate embodiment as previously noted, the controller 120 may instead issue an alert to the operator of the vehicle 100 or implement predefined maneuvers based on identifying the errant signal. According to yet another alternate embodiment as discussed with reference to FIG. 4, control of each image sensor module 110 may be individualized based on a corresponding spectrometer module 115.

Figure 4:
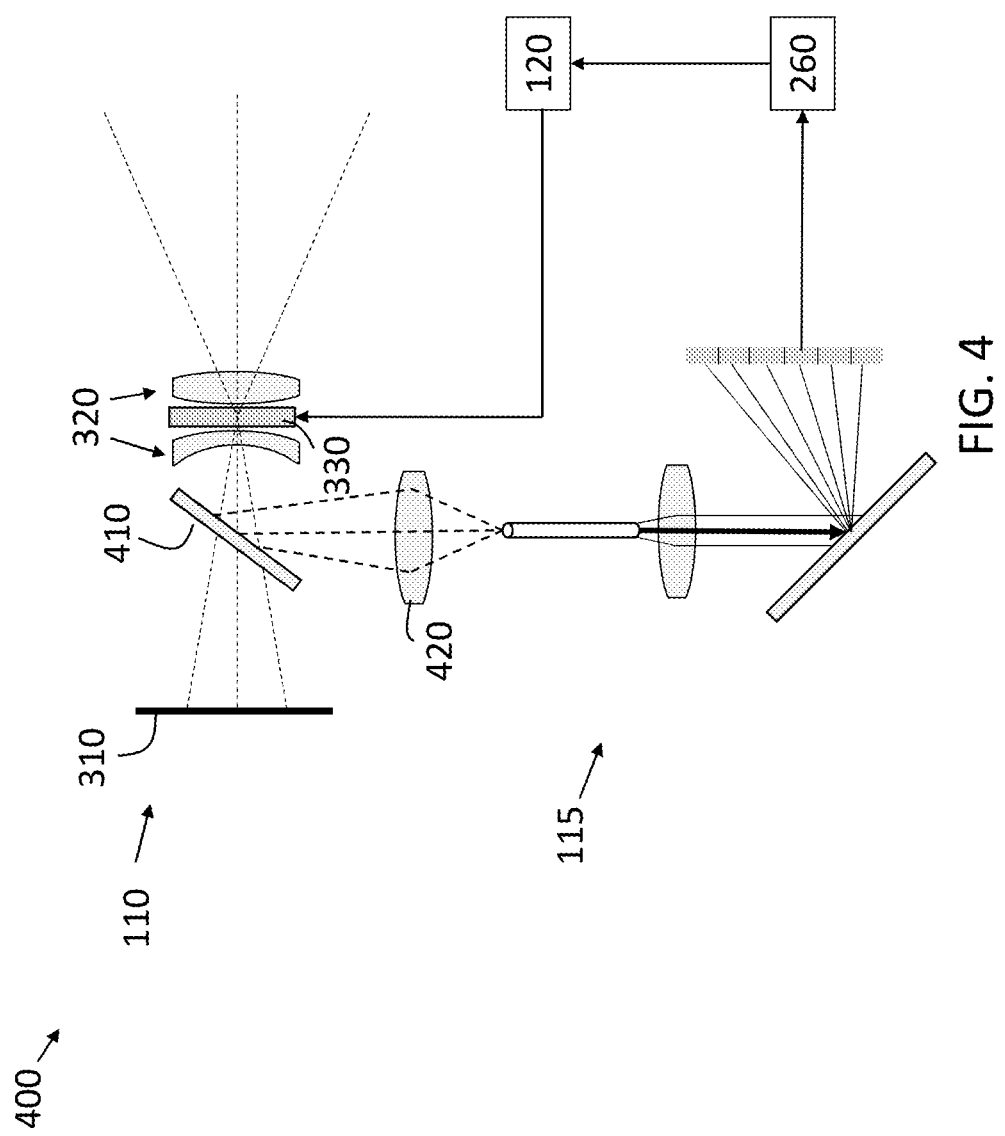
FIG. 4 details an exemplary imaging system used for mitigation of errant signal effects on an image sensor of an image sensor module of the vehicle according to an exemplary embodiment.

FIG. 4 details an exemplary imaging system 400 used for mitigation of errant signal effects on an image sensor 310 of an image sensor module 110 of the vehicle 100 according to an exemplary embodiment. The imaging system 400 includes a spectrometer module 115 and an imaging sensor 110 according to one or more embodiments. In addition, the imaging system 400 includes a beam splitter 410 and lens 420. As FIG. 4 indicates, the beam splitter 410 is arranged such that light input to the spectrometer module 115 is the light received by the image sensor module 110. Thus, unlike the exemplary embodiment of the spectrometer module 115 shown in FIG. 2, the spectrometer module 115, according to the embodiment shown in FIG. 4, corresponds with a particular image sensor module 110. Thus, any errant signal identified by the spectral peak detector 260 is a signal that affects the image sensor module 110. Further, the filtering of the errant signal, based on the controller 120 controlling the spectral filter 330 thickness, has a direct effect on the light directed to the image sensor 310 of the image sensor module 110.

According to an exemplary embodiment, each image sensor module 110 shown in FIG. 1, for example, may be part of an imaging system 400. As such, rather than a general spectrometer module 115, as shown on the roof of the vehicle 100 in FIG. 1, each image sensor module 110 of each imaging system 400 would include a corresponding spectrometer module 115 that determines whether an errant signal is affecting the image sensor 310 of the image sensor module 110. Further, the controller 120 would obtain information from each spectral peak detector 260 of each imaging system 400 and individually and independently control the spectral filter 330 of each imaging system 400 as needed.

Figure 5:
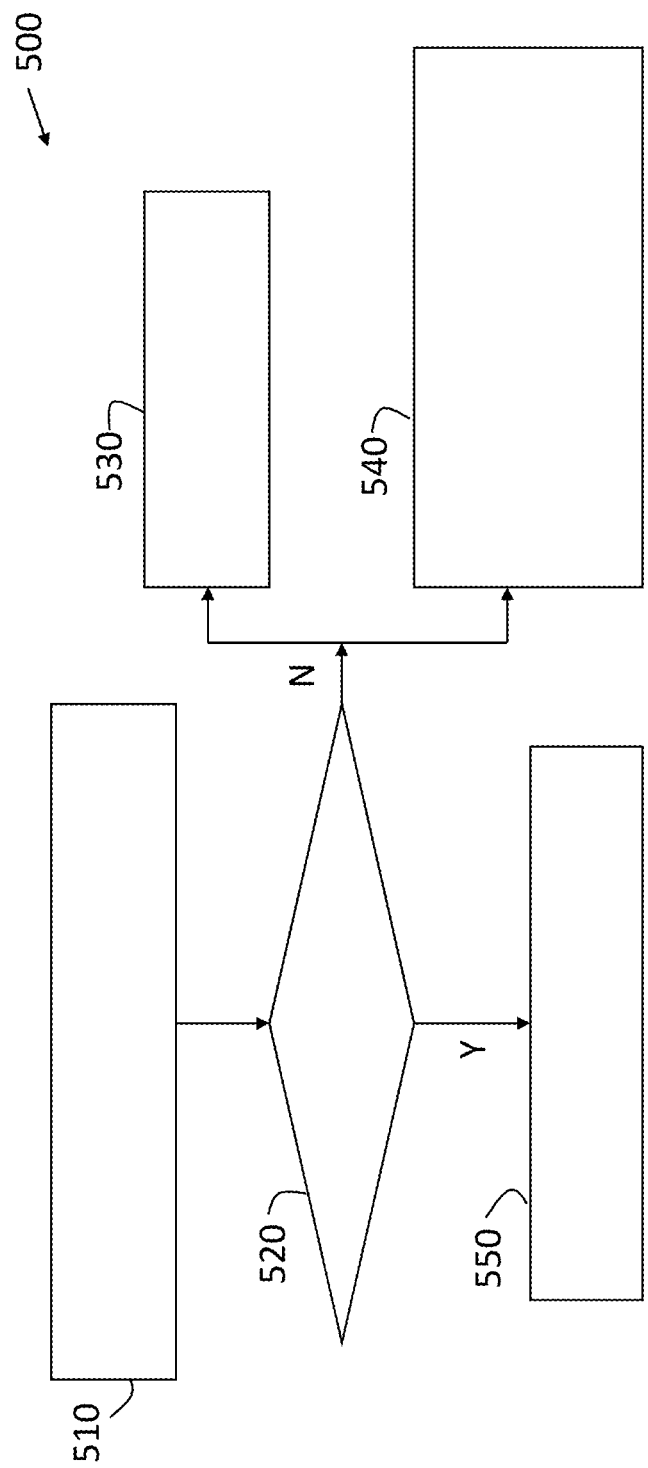
FIG. 5 is a process flow of a method of mitigating errant signal effects on one or more image sensors of associated image sensor modules of the vehicle according to one or more embodiments.

FIG. 5 is a process flow of a method 500 of mitigating errant signal effects on one or more image sensors 310 of associated image sensor modules 110 of the vehicle 100 according to one or more embodiments. At block 510, obtaining a wavelength of an errant signal using a spectrometer module 115 refers to the processes discussed with reference to FIG. 2. For example, the process at block 510 includes obtaining signals at different wavelengths using the pixelated sensor 250 and determining if the intensity indicated by the spectral peak detector 260 exceeds a threshold value at any wavelength. If an errant signal is detected, the action of the controller 120 may depend on whether the spectrometer module 115 is specific to an image sensor module 110. Thus, a check is shown at block 520. This check may or may not be performed by the controller 120 because the controller 120 may have a priori knowledge of whether imaging systems 400 or a separate spectrometer module 115 are used in the vehicle 100.

If the spectrometer module 115 does not correspond with a specific image sensor 310 of an image sensor module 110, then the processes at blocks 530 or 540 may be performed. At block 530, an alert may be issued (e.g., regarding potential spoofing) or predefined evasive maneuvers may be implemented. At block 540, the spectral filter 330 of every image sensor module 110 may be adjusted by the controller 120 to mitigate the potential of the errant signal reaching the image sensor 310 of any image sensor module 110.

If the spectrometer module 115 does correspond with a specific image sensor 310 (i.e., an imaging system 400 is used), then the process at block 550 is performed. At block 550, the process includes controlling the spectral filter 330 of the image sensor module 110 to which the spectrometer module 115 corresponds as part of the imaging system 400. Thus, the spectral filter 330 is adjusted only when an errant signal is identified as being directed to the specific image sensor 310 of the imaging system 400.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method to mitigate an effect of an errant signal on an image sensor of a vehicle, the method comprising:
   collecting light, using a spectrometer, and separating the light to obtain signals at different wavelengths;
   determining, using a spectral peak detector, an intensity of the light at each of the different wavelengths;
   identifying, using a controller, the errant signal based on the intensity of the light exceeding a threshold value at an errant signal wavelength among the different wavelengths; and
   mitigating the errant signal using the controller.

2. The method according to claim 1, wherein the collecting the light includes collecting from a 360 degree span.

3. The method according to claim 2, wherein the mitigating includes issuing an alert or performing a predefined maneuver of the vehicle.

4. The method according to claim 2, wherein the mitigating includes filtering out the errant signal wavelength from input light to the image sensor.

5. The method according to claim 4, wherein the mitigating includes filtering out the errant signal wavelength from the input light to one or more additional image sensors of the vehicle.

6. The method according to claim 1, wherein the collecting the light includes obtaining input light to the image sensor.

7. The method according to claim 6, wherein the obtaining the input light to the image sensor includes using a beam splitter in a path of the input light to the image sensor.

8. The method according to claim 6, wherein the mitigating includes filtering out the errant signal wavelength from the input light to the image sensor.

9. The method according to claim 8, wherein the filtering out the errant signal wavelength includes changing a thickness of a spectral filter in a path of the input light to the image sensor.

10. The method according to claim 9, wherein the changing the thickness of the spectral filter includes controlling a microelectromechanical system.

11. A system to mitigate an effect of an errant signal on an image sensor of a vehicle, the system comprising:
- a spectrometer configured to collect light and separate the light to obtain signals at different wavelengths;
- a spectral peak detector configured to determine an intensity of the light at each of the different wavelengths; and
- a controller configured to identify the errant signal based on the intensity of the light exceeding a threshold value at an errant signal wavelength among the different wavelengths and to mitigate the errant signal.

12. The system according to claim 11, wherein the spectrometer is configured to collect the light from a 360 degree span.

13. The system according to claim 12, wherein the controller is configured to mitigate the errant signal by issuing an alert or performing a predefined maneuver of the vehicle.

14. The system according to claim 12, wherein the controller is configured to mitigate the errant signal by filtering out the errant signal wavelength from input light to the image sensor.

15. The system according to claim 14, wherein the vehicle includes one or more additional image sensors, and the controller is further configured to filter out the errant signal wavelength from the input light to the one or more additional image sensors.

16. The system according to claim 11, wherein the spectrometer is configured to collect the light by obtaining input light to the image sensor.

17. The system according to claim 16, further comprising a beam splitter in a path of the input light to the image sensor configured to direct the input light to the image sensor to the spectrometer.

18. The system according to claim 16, wherein the controller is configured to mitigate the errant signal by filtering out the errant signal wavelength from the input light to the image sensor.

19. The system according to claim 18, further comprising a spectral filter in a path of the input light to the image sensor, wherein the controller is configured to filter out the errant signal wavelength by changing a thickness of the spectral filter.

20. The system according to claim 19, wherein the controller is configured to change the thickness of the spectral filter by controlling a microelectromechanical system.

* * * * *